United States Patent [19]
Ide et al.

[11] Patent Number: 5,916,730
[45] Date of Patent: *Jun. 29, 1999

[54] OPTICAL INFORMATION RECORDING MEDIUM AND RECORDING METHOD BY USE OF THE RECORDING MEDIUM

[75] Inventors: Yukio Ide, Mishima; Makoto Harigaya, Hiratsuka; Yoshiyuki Kageyama, Yokohama; Hiroko Iwasaki, Tokyo, all of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/783,508

[22] Filed: Jan. 14, 1997

Related U.S. Application Data

[63] Continuation of application No. 08/592,223, Jan. 26, 1996, abandoned, which is a continuation of application No. 08/195,989, Feb. 14, 1994, abandoned, which is a continuation of application No. 07/885,500, May 19, 1992, abandoned.

[30] Foreign Application Priority Data

Oct. 1, 1991 [JP] Japan .................................... 3-253632
May 15, 1992 [JP] Japan .................................... 4-123551

[51] Int. Cl.$^6$ ........................................................ G11B 7/00
[52] U.S. Cl. .................... 430/270.13; 430/945; 430/346; 430/273.1; 369/275.4; 369/275.2; 428/64.5
[58] Field of Search ............................. 369/275.4, 275.2; 430/273.1, 346, 945

[56] References Cited

U.S. PATENT DOCUMENTS

| | | | |
|---|---|---|---|
| 4,816,385 | 3/1989 | Gravesteijn et al. | 430/270.13 |
| 4,847,132 | 7/1989 | Takao et al. | 369/283 |
| 4,889,746 | 12/1989 | Utsumi et al. | 427/162 |
| 4,900,598 | 2/1990 | Suzuki | 369/288 |
| 4,904,577 | 2/1990 | Tyan et al. | 430/495 |
| 4,947,372 | 8/1990 | Koshino et al. | 430/945 |
| 4,954,379 | 9/1990 | Nishida et al. | 369/288 |
| 5,011,723 | 4/1991 | Harigaya et al. | 430/945 |
| 5,015,548 | 5/1991 | Pan et al. | 430/346 |
| 5,063,097 | 11/1991 | Hirola et al. | 369/283 |
| 5,080,947 | 1/1992 | Yamada et al. | 430/945 |
| 5,095,479 | 3/1992 | Harigaya et al. | 430/945 |
| 5,124,232 | 6/1992 | Nakanishi et al. | 430/270 |
| 5,156,693 | 10/1992 | Ide et al. | 346/135.1 |
| 5,206,114 | 4/1993 | Kobayashi | 430/270.13 |

FOREIGN PATENT DOCUMENTS

| | | |
|---|---|---|
| 0184452 | 6/1986 | European Pat. Off. . |
| 0314859 | 5/1989 | European Pat. Off. ............... 369/283 |
| 6192459 | 5/1986 | Japan .................................... 369/283 |
| 3-197173 | 8/1991 | Japan . |

OTHER PUBLICATIONS

Patent abstract of Japan, vol. 15, No.458 (M–1182) Nov. 1992, and Abstract of JP–A–31 97 173.

(List continued on next page.)

*Primary Examiner*—Martin Angebranndt
*Attorney, Agent, or Firm*—Cooper & Dunham LLP

[57] ABSTRACT

An optical information recording medium capable of recording information, reproducing recorded information, erasing recorded information, and rewriting recorded information, is composed of a substrate, a recording layer formed on the substrate, the recording layer including as the main component a four-component phase-change recording material comprising Ag, In, Te and Sb, and containing a crystalline phase composed of the microcrystallites of $AgSbTe_2$ at the erasure of recorded information, an upper heat resistant protective layer formed on the recording layer, the upper heat resistant protective layer including a heat resistant material with a thermal conductivity of 1.0 W/cm.deg or more, and an optical reflecting layer formed on the upper heat resistant protective layer. Optical information can be recorded in this recording medium by applying a laser beam to the recording layer through the substrate at a linear velocity of disc rotation of 1.2 to 5.6 m/sec.

6 Claims, 4 Drawing Sheets

AgSbTe$_2$ Crystallites

Amorphous In-Sb

OTHER PUBLICATIONS

Patent abstract of Japan, vol. 16, No.331 (M–1282) Jul. /1992, and Abstract of JP–A–40 94 965.

Database WPI, Section EI, Week 9245, (Derwent Publications), Abstract of JP–A–3 240 590. Oct.1991.

Database WPI, Section EI, Week 9245, (Derwent Publications, Abstract of JP–A–4 078 031. Mar.1992.

Database WPI, Section EI, Week 9245, (Derwent Publications), Abstract of JP–A–4 232 779. Aug.1992.

Patent abstracts of Japan, vol. 13, No.590, (P–984) Dec.1989, Abstract of JP–12 51 332.

Patent Abstracts of Japan, vol. 13, No. 353 (P–913) Aug.1989, Abstract of JP–A–11 12 538 (Matsushita Electric Ind. Co.Ltd).

OPTICAL INFORMATION RECORDING MEDIUM AND RECORDING METHOD BY USE OF THE RECORDING MEDIUM

CROSS REFERENCE TO RELATED APPLICATIONS

This is a continuation of application Ser. No. 592,223, filed Jan. 26, 1996 (now abandoned), which is a continuation of application Ser. No. 195,989, filed Feb. 14, 1994 (now abandoned), which is a continuation of application Ser. No. 885,500, filed May 19, 1992 (now abandoned).

BACKGROUND OF THE INVENTION

1. Field of the Invention

The present invention relates to an optical information recording medium, and more particularly to a phase-change type optical information recording medium wherein a phase change, resulting from the application of a laser beam thereto, is produced in a material which forms a recording layer to provide an information recording medium which is capable of recording information, reproducing recorded information, erasing recorded information, rewriting or overwriting information at low linear velocity of disc rotation, and is suitable for application in optical memory related equipment, in particular, rewritable compact disc (CD).

2. Discussion of Background

One commonly known type of optical memory medium capable of writing, reproducing and erasing of information by the application of electromagnetic waves, in particular, a laser beam is the phase-change type of recording medium which utilizes the transition from a crystalline phase to a non-crystalline or amorphous phase or from one crystalline phase to another crystalline phase. In particular, with respect to this type of recording medium, research and development has recently become very active because overwriting using a single beam, which is difficult in the case of a magneto-optical memory, is possible, and the optical system on the drive side for this recording medium has a simpler mechanism than the optical system for a magneto-optical memory.

Chalcogen type alloy materials such as Ge—Te, Ge—Te—Sb—S, Ge—Te—S, Ge—Se—S, Ge—Se—Sb, Ge—As—Se, In—Te, Se—Te, Se—As and the like, as disclosed in U.S. Pat. No. 3,530,441, can be given as representative examples of a material for the phase-change type recording medium. Furthermore, it has been proposed to add to the Ge—Te alloys, materials such as Au as disclosed in Japanese Laid-Open Patent Application 61-219692, Sn and Au in Japanese Laid-Open Patent Application 61-270190, and Pd in Japanese Laid-Open Patent Application 62-19490 with the object of improving the stability and speed of crystallization. A material with a specified composition ratio for Ge—Te—Se—Sb as disclosed in Japanese Laid-Open Patent Application 62-73438 has also been suggested for improving the write/erase repeatability characteristics. However, none of these methods completely satisfies the many characteristics required in a phase-change type optical memory medium in which overwriting is possible.

Furthermore, in Japanese Laid-Open Patent Application 63-251290, there is proposed an optical information recording medium with a recording layer composed of a multi-component (substantially tertiary or more) compound whose crystalline state is of a single phase. This type of recording medium is hereinafter referred to as "optical recording medium". An example of such a single phase multi-component compound is $In_3SbTe_2$. In a recording layer containing such a compound, the amount of the compound is 90% or more. By use of such a recording layer, high speed recording and erasure become possible. However, the laser power now available for recording information in the recording layer and erasing the recorded information therefrom is insufficient, so that such a recording layer has the shortcoming of a low erase ratio.

In Japanese Laid-Open Patent Application 1-277338, there is proposed an optical recording medium comprising a recording layer which is composed of an alloy represented by the following formula:

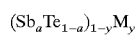

$(Sb_aTe_{1-a})_{1-y}M_y$ wherein $0.4 \leq a < 0.7$, $y \leq 0.2$, and M represents an element selected from the group consisting of Ag, Al, As, Au, Bi, Cu, Ga, Ge, In, Pb, Pt, Se, Si, Sn and Zn.

The basic composition of this alloy is $Sb_2Te_3$. By increasing the amount of Sb excessively, the high speed erasability and repeated use characteristics of the optical recording medium are improved. Furthermore, the addition of M to the basic composition further improves the high speed erasability and erase ratio. However, nothing is mentioned about the erase ratio at overwriting in this Japanese Laid-Open Patent Application. According to tests conducted by the inventors of the present invention, incomplete erasure was observed and the recording sensitivity was insufficient for use in practice.

In a recording layer of an optical recording medium disclosed in Japanese Laid-Open Patent Application 60-177446, an alloy represented by the following formula is employed:

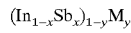

$(In_{1-x}Sb_x)_{1-y}M_y$ wherein $0.55 \leq x \leq 0.80$, $0 \leq y \leq 0.20$, and M represents Au, Ag, Cu, Pd, Pt, Al, Si, Ge, Ga, Sn, Te, Se or Bi.

Furthermore, in a recording layer of an optical recording medium disclosed in Japanese Laid-Open Patent Application 63-228433, an alloy represented by the following formula is employed:

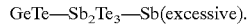

$GeTe—Sb_2Te_3—Sb(excessive)$.

None of these optical recording media, however, exhibits satisfactory recording sensitivity and erase ratio. In particular, the most important problems to be solved are the improvement of write and erase sensitivity, prevention of lowering of erase ratio resulting from failure of erase prior to overwriting, and improvement of the life of both the recorded and unrecorded portions in the recording layer.

In order to solve these problems, the provision of a chemically stable, heat resistant protective layer on both sides of the recording layer has been proposed in Japanese Laid-Open Patent Applications 61-5450 and 63-259855.

Generally the heat resistant protective layer is required to have the properties, for instance, of being transparent to a laser beam, and having a melting point sufficiently higher than the temperatures at the recording and erasing operations, high mechanical strength and high stability to chemicals. Of these properties, stability to chemicals is significantly important when the heat resistant protective layer is used for a phase-change type recording layer, in particular in the case where chalcogen type compounds are employed in the recording layer, since chalcogen elements in the compounds are very active.

Conventionally employed oxide-based dielectric materials generally do not satisfy the above requirements.

The heat resistant protective layer also has a heat radiation or heat transfer function.

When the thermal conductivity of a thermal radiation layer is too small, a rapid cooling effect necessary for making the recording layer amorphous cannot be obtained, while when the thermal conductivity thereof is too large, the applied heat cannot be used effectively, so that the conditions for gradual cooling of the alloy in the recording layer cannot be appropriately set. As a result, the write and erase sensitivity is decreased in both cases. Thus it is necessary to adjust the thermal conductivity of the heat radiation layer in such a manner as to be suitable for the recording layer. However, it is extremely difficult to adjust the thermal conductivity of the heat radiation layer to a wide range so long as the above-mentioned conventional materials are employed in the heat resistant protective layer.

For instance, when the linear velocity of disc rotation for recording by a laser beam is 6 m/sec or less, namely 4 times the standard linear velocity of disc rotation (about 1.2 m/sec to 1.4 m/sec) for a conventional compact disc, the cooling rate on recording, that is, on the absorption of the energy of a laser beam applied, is insufficient, so that appropriate recording marks cannot be formed in the recording disc.

SUMMARY OF THE INVENTION

Accordingly, an object of the present invention is to provide, with due consideration to the drawbacks of such conventional information recording media, an optical information recording medium such as a compact disc, with a long life expectancy, a high erase ratio, and high writing and erasure sensitivity, without the deterioration of the C/N ratio, on which repeated writings and erasures are possible without the necessity for any complicated recording and erasing system.

Another object of the present invention is to provide a recording method for recording optical information by use of the above optical information recording medium.

The first object of the present invention is achieved by an optical information recording medium capable of recording information, reproducing recorded information, erasing recorded information, and rewriting recorded information, comprising a substrate, a recording layer formed on the substrate, an upper heat resistant protective layer formed on the recording layer, and an optical reflecting layer formed on the upper heat resistant protective layer, the recording layer comprising as the main component a four-component phase-change recording material comprising Ag, In, Te and Sb, and containing a crystalline phase comprising fine crystallites of $AgSbTe_2$ at the erasure of recorded information, and the upper heat resistant protective layer comprising a material with a thermal conductivity of 1.0 W/cm.deg or more.

It is preferable that the size of the crystallites of $AgSbTe_2$ in the crystalline phase be in the range of 1000 Å or less.

Furthermore, the material for the upper heat resistant protective layer is preferably selected from the group consisting of cubic boron nitride (cubic-BN), silicon carbide (SiC), and aluminum nitride (AlN). At the erasure, the phase-change recording material contained as the main component in the recording layer is represented by the following formula:

$$(AgSbTe_2)_x(InSb_y)_{1-x}$$

wherein $0.4 \leq x \leq 0.55$ and $0.5 \leq y \leq 2.5$.

A lower heat resistant protective layer may be interposed between the substrate and the recording layer.

The optical reflecting layer preferably may comprise Ag, Au or alloys thereof.

The second object of the present invention can be achieved by applying a laser beam to the recording layer through the substrate while the optical information recording medium is rotated at a linear velocity of 1.2 to 5.6 m/sec.

DETAILED DESCRIPTION OF THE PREFERRED EMBODIMENTS

The present invention will now be explained with reference to the accompanying drawings.

Figure 1:
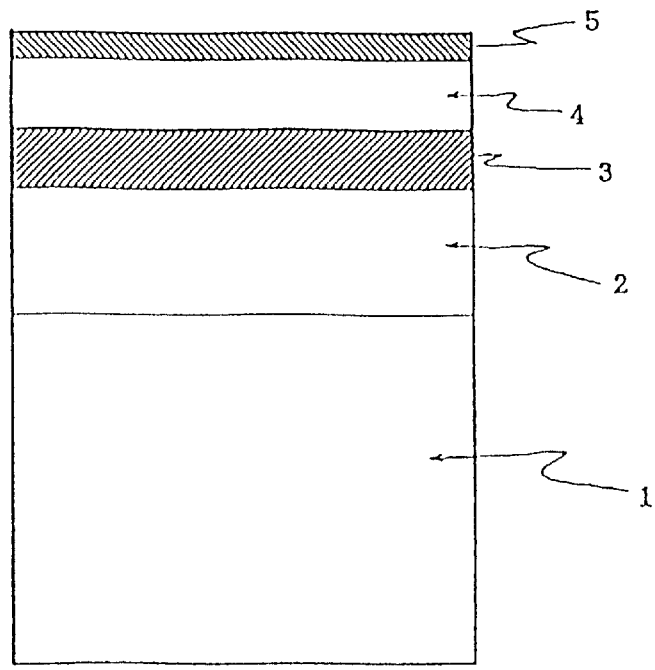
FIG. 1 is a schematic cross-sectional view of the structure of an example of an optical information recording medium according to the present invention.

FIG. 1 shows the structure of an example of an optical information recording medium of the present invention. In this example, a lower heat resistant protective layer 2, a recording layer 3, an upper heat resistant protective layer 4, and an optical reflecting layer 5 which reflects light (hereinafter referred to as the reflecting layer) are provided in that order on a substrate 1. As required, an environment protection layer (not shown) may be provided on the reflecting layer 5.

The lower heat resistant protective layer is not necessarily required. However, in the case where the substrate is made from a material with low heat resistance, such as polycarbonate resin, it is preferable that the lower heat resistant protective layer 2 be provided.

Each of the upper heat resistant protective layer 4 and the reflecting layer 5 is made of a material having a relatively high thermal conductivity.

A cubic boron nitride (cubic-BN) layer, a silicon carbide (SiC) layer and an aluminum nitride (AlN) layer not only satisfy basic properties required for the heat resistant protective layer of optical discs, such as high melting point and transparency, but also are suitable for the upper heat resistant protective layer 4 since they have higher thermal conductivities than dielectric materials in general use and match the materials for the recording layer of a phase-change type recording disc.

Materials comprising as the main component a four-component phase change material comprising Ag, In, Te and Sb are suitable for the materials for the recording layer 3 since such materials have excellent recording sensitivities (properties of changing from a crystalline state to an amorphous state), erasure sensitivities (crystallization), linear velocity and erase ratio.

The composition of the recording layer 3 for use in the present invention was analyzed by fluorescent X-ray. The composition of the recording layer can also be analyzed by analytical methods such as X-ray microanalysis, Rutherford back scattering, and Auger electron spectroscopy When the composition of the recording layer 3 is measured by any of these analytical methods, it is necessary to compare the values obtained by fluorescent X-ray with the values obtained by the analytical method employed.

X-ray diffraction and electron diffraction are suitable for investigating the materials contained in the recording layer 3.

Electron diffraction is suitable for investigating the crystalline state of the materials in the recording layer. In the case where whether a material is in a crystalline state or in an amorphous state is judged by electron diffraction, if a spot-shaped or debye-ring-shaped pattern is observed, the material is judged to be in a crystalline state, and if a ring-shaped or halo pattern is observed, the material is judged to be in an amorphous state. The diameter of each crystal can be determined from a half-value width of an X-ray diffraction peak by using the Scherrer Equation.

Figure 2:
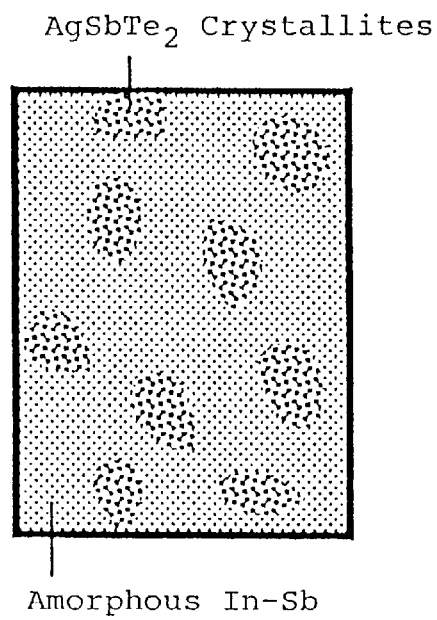
FIG. 2 is a schematic illustration of crystalline phases comprising crystallites of $AgSbTe_2$ which are present in the recording layer of the optical information recording medium at the erasure of recorded information.

FIG. 2 schematically shows the state of the recording layer in a stable state in which no recording is carried out or erasure is carried out, which can be considered as such from the observation results by use of an electron microscope, the electron diffraction analysis, and the X-ray diffraction analysis. As shown in the figure, $AgSbTe_2$ in a microcrystalline state and $InSb_y$ in an amorphous state are present in the form of a mixture in the recording layer. $AgSbTe_2$ in a micro crystalline state has a crystallite diameter of 1000 Å or less. In such a microcrystalline state, the areas in which the phase change from the crystalline state to an amorphous state occurs are limited to an extremely narrow range, so that a uniform phase change can be caused to take place at high speed. In other words, the phase change from the crystalline state to an amorphous state can be caused to take place with minimum chemical and physical dispersions. As a result, a high erase ratio can be obtained.

Since the crystallites of $AgSbTe_2$ have such a small diameter as 1000 Å or less, the melting point of $AgSbTe_2$ is decreased due to the small crystallite size. As a result, the phase change takes place at a relatively low temperature, so that the recording sensitivity of the recording medium is increased. In other words, when the crystallite diameter of $AgSbTe_2$ is larger than 1000 Å, the recording sensitivity and erase ratio tend to be decreased.

$AgSbTe_2$ is surrounded by the amorphous $InSb_y$. It is considered that the amorphous $InSb_y$ prevents the microcrystallites of $AgSbTe_2$ from growing to become large grains.

The composition of the recording layer is represented by $(AgSbTe_2)_x(InSb_y)_{1-x}$, wherein $0.4 \leq x \leq 0.55$ and $0.5 \leq y \leq 2.5$, preferably $0.42 \leq x \leq 0.50$ and $0.75 \leq y \leq 2.2$.

The combined use of the above recording layer and the upper heat resistant protective layer makes it possible to satisfy both the rapid cooling conditions at recording with the phase change to an amorphous state, and the gradual cooling conditions at erasure with the phase change to a crystalline state even at a low linear velocity of disc rotation of 1.2 to 5.6 m/sec, whereby excellent recording and erasing characteristics can be attained.

It is preferable that the heat resistant protective layer have a large optical energy gap (Eg. opt), specifically 1.5 eV or more, because the large optical energy gap of the heat resistant protective layer serves to improve the reflection ratio of the optical disc fabricated according to the present invention.

It is preferable that the lower and upper heat resistant protective layers have a melting point of 800° C. or more, more preferably 1000° C. or more. It is preferable that the upper heat resistant protective layer have a thermal conductivity of 1.0 W/cm.deg or more.

Generally it is extremely difficult to measure the thermal conductivity of a thin film layer with a thickness in the order of $\mu$m or less, such as the above-mentioned upper heat resistant protective layer. Therefore, in the present invention, the thermal conductivity of the material for the upper heat resistant protective layer has been obtained by measuring the same material in a bulk state, for example, by the conventional longitudinal direct method or laser flash method.

Cubic-BN used as a material for the upper heat resistant protective layer of the optical information recording medium of the present invention has a melting point of 3000° C. and a thermal conductivity of 13.0 W/cm.deg and has excellent properties for use in the upper heat resistant protective layer.

Although there is no restriction to the methods for preparing cubic-BN for use in the present invention, it is preferable to employ Ion Beam and Vapor Deposition Method (IVD Method) in which the electron beam deposition of boron and the ion beam deposition of nitrogen are combined.

SiC used as a material for the upper heat resistant protective layer of the optical information recording medium of the present invention has a melting point of 2200° C. and a thermal conductivity of 5.0 W/cm.deg and has excellent properties for use in the upper heat resistant protective layer.

AlN used as a material for the upper heat resistant protective layer of the optical information recording medium of the present invention has a melting point of 2230° C. and a thermal conductivity of 2.6 W/cm.deg and has also excellent properties for use in the upper heat resistant protective layer.

The recording layer used in the present invention can be formed by various types of vapor deposition methods such as, for example, the vacuum evaporation method, the sputtering method, the plasma CVD method, the optical CVD method, the ion plating method, the electron beam deposition method, and the like. Methods other than vapor deposition methods which can be used include wet process methods such as the sol-gel method.

It is preferable that the thickness of the recording layer be in the 100 Å to 10,000 Å range, and more preferably in the 200 Å to 3000 Å range, in order to obtain an appropriate light absorption performance and to attain uniform phase change at high speed.

The substrate for use in the present invention is usually made of glass, ceramics, or resins. Resins are ideal as substrate materials from the aspect of ease of fabrication, cost, and the like. Representative examples of the resins include polycarbonate resin, acrylic resin, epoxy resin, polystyrene resin, acrylonitrile-styrene copolymer resin, polyethylene resin, polypropylene resin, silicone resin, fluorine-containing resin, ABS resin, urethane resin, and the like. However from the aspect of processability, optical characteristics, and the like, polycarbonate resin and acrylic resin are preferable The substrate may be in the shape of a disc, a card, or a sheet.

The materials for the lower heat resistant protective layer may be metallic oxide compounds such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN, and ZrN; sulfides such as ZnS, $In_2S_3$, and $TaS_4$; carbides such as SiC, TaC, $B_4C$, WC, TiC, and ZrC, a diamond-type carbon, and a mixture of these. These materials can be used individually for a protective layer or can be mixed together. Impurities may also be added as required.

The melting point of the heat resistant protective layer must be higher than the melting point of the recording layer. This type of protective layer can be formed by various types of vapor deposition methods such as the vacuum deposition method, the sputtering method, the plasma CVD method, the optical CVD method, the ion plating method, the electron beam deposition method, and the like.

It is preferable that the thickness of the heat resistant protective layers be in the 200 Å to 5000 Å range, and more preferably in the 500 Å to 3000 Å range. If less than 200 Å, the effectiveness as a heat resistant protective layer tends to be decreased; if greater than 5000 Å, the sensitivity tends to decrease and there is a tendency for peeling to occur at the interface. The protective layer may also be built up in laminations as required.

Metallic materials such as Al, Au, and the like and alloys thereof can be used for the reflecting layer. Materials having a high thermal conductivity of 2.0 W/cm.deg or more, such as Ag, Au, Cu, Al and alloys thereof are preferable for use in the reflecting layer. Specifically, Ag has a thermal conductivity of 4.2 W/cm.deg and Au has a thermal conductivity of 3.0 W/cm.deg.

It is preferable that the thickness of the heat resistant protective layers be in the 200 Å to 3000 Å range, and more preferably in the 500 Å to 2000 Å range. The reflecting layer also serves as heat radiating layer.

This type of reflecting layer can be formed by various types of vapor deposition methods such as the vacuum evaporation method, the sputtering method, the plasma CVD method, the optical CVD method, the ion plating method, the electron beam evaporation method, and the like.

The present invention will now be explained with reference to specific examples which are given for illustration of the invention and are not intended to be limiting thereof.

EXAMPLE I-1

A lower heat resistant protective layer composed of $ZnS+SiO_2$ (20%) was deposited to a thickness of 2000 Å on a polycarbonate substrate with a groove with a 1.6 µm pitch and a 700 Å groove depth, a 1.2 mm thickness, and a 120 mm diameter, using the rf sputtering method.

A recording layer composed of $(AgSbTe_2)_{0.43}(InSb_{0.77})_{0.57}$ was deposited to a thickness of 200 Å on the above prepared lower heat resistant protective layer, using the rf sputtering method.

An upper heat resistant protective layer composed of cubic-BN was deposited to a thickness of 1000 Å on the above recording layer, using the IVD method.

Finally a reflecting layer of Au was deposited to a thickness of 700 Å on the upper heat resistant protective layer, using the rf sputtering method, whereby an optical information recording medium No. I-1 in the form of a disc according to the present invention was fabricated.

The evaluation of the above optical information recording medium No. I-1 was carried out using a 780 nm semiconductor laser beam by applying an about 1 µm diameter spot through a lens with a numerical number (NA) of 0.5 onto the surface of the recording medium from the substrate side.

The recording layer immediately after fabrication was in an amorphous state, but for the evaluation measurement, a DC light beam (non-modulated light beam) was applied to the entire surface of the recording medium in such a manner that the light energy on the surface of the medium was 8 mW, so that the entire surface of the recording medium was crystallized in an adequate fashion to provide the initial, unrecorded state.

The recording performance of the recording medium was evaluated by the application of a laser beam with a pulse width of 690 ns, with the linear velocity for the rotation of the recording medium kept constant at 1.3 m/sec, and the write power of the laser beam changed by 1 mW in each step from 7 mW to 14 mW. The power for a reproduction light beam was kept constant at 0.6 mW. As a result, signals with C/N ratios of 46 dB or more were obtained with the write power in the range of 8 mW to 14 mW. The recorded signals were erased with the application of a DC light with a power of 8 mW. The result was that the recording marks were erased almost completely and unerased portions were negligible. The specific C/N ratios and erase ratios obtained are shown in Table I.

Furthermore, this recording medium was subjected to a one-beam overwrite test under the following conditions:

Linear Velocity of Disc Rotation: 1.3 m/sec
Recording Power (Pw): 12 mW
Erasing Power (Pe): 7 mW
Recording Frequency: $f_1$=0.40 MHz
f=0.72 MHz The result was that the C/N ratio and erase ratio were respectively 52 dB, and −35 dB, when overwriting was conducted in a track in which recording had been carried out with the recording frequency $f_1$. These results are also shown in Table I.

The above overwrite test was repeated more than 1000 times. No deterioration was observed in the characteristics of this recording medium after the overwrite test.

EXAMPLE I-2

The procedure for the fabrication of the optical information recording medium No. I-1 in Example I-1 was repeated except that the recording layer composed of $(AgSbTe_2)_{0.43}(InSb_{0.77})_{0.57}$ and the reflecting layer composed of Au employed in Example I-1 were respectively replaced by a recording layer composed of $(AgSbTe_2)_{0.42}(InSb_{1.8})_{0.58}$ and a reflecting layer composed of Ag, whereby an optical information recording medium No. I-2 according to the present invention was fabricated.

The thus fabricated optical information recording medium No. I-2 was subjected to the same evaluation test for evaluating the recording performance thereof, and to the same one-beam overwrite test as in Example I-1. The results are shown in Table I. The overwrite test was repeated more than 1000 times in the same manner as in Example I-1. No deterioration was observed in the characteristics of this recording medium after the overwrite test.

COMPARATIVE EXAMPLE I-1

The procedure for the fabrication of the optical information recording medium No. I-1 in Example I-1 was repeated except that the recording layer composed of $(AgSbTe_2)_{0.43}$ $(InSb_{0.77})_{0.57}$ employed in Example I-1 was replaced by a recording layer composed of $(AgSbTe_2)_{0.32}(InSb_{1.9})_{0.68}$, whereby a comparative optical information recording medium No. I-1 was fabricated.

The thus fabricated comparative optical information recording medium No. I-1 was subjected to the same evaluation test for evaluating the recording performance thereof. The results are shown in Table I.

COMPARATIVE EXAMPLE I-2

The procedure for the fabrication of the optical information recording medium No. I-1 in Example I-1 was repeated except that the recording layer composed of $(AgSbTe_2)_{0.43}$ $(InSb_{0.77})_{0.57}$ and the upper heat resistant protective layer of cubic-BN employed in Example I-1 were respectively replaced by a recording layer composed of $(AgSbTe_2)_{0.50}$ $(InSb_3)_{0.50}$ and an upper heat resistant protective layer composed of $ZnS+SiO_2$ (20%), whereby a comparative optical information recording medium No. I-2 was fabricated.

The thus fabricated comparative optical information recording medium No. I-2 was subjected to the same evaluation test for evaluating the recording performance thereof. The results are shown in Table I.

COMPARATIVE EXAMPLE I-3

The procedure for the fabrication of the optical information recording medium No. I-1 in Example I-1 was repeated except that the recording layer composed of $(AgSbTe_2)_{0.43}$ $(InSb_{0.77})_{0.57}$ employed in Example I-1 was replaced by a recording layer composed of $(AgSbTe_2)_{0.60}(InSb_{18})_{0.40}$ whereby a comparative optical information recording medium No. I-3 was fabricated.

The thus fabricated comparative optical information recording medium No. I-3 was subjected to the same evaluation test for evaluating the recording performance thereof. The results are shown in Table I.

An upper heat resistant protective layer composed of SiC was deposited to a thickness of 1000 Å on the above recording layer, using the rf sputtering method.

Finally a reflecting layer composed of Au was deposited with a thickness of 700 Å on the upper heat resistant protective layer, using the rf sputtering method, whereby an optical information recording medium No. II-1 in the form of a disc according to the present invention was fabricated.

The evaluation of the above optical information recording medium No. II-1 was carried out in the same manner as in Example I-1. As a result, signals with C/N ratios of 45 dB or more were obtained with the write power in the range of 9 mW to 14 mW. The recorded signals were erased with the application of a DC light with a power of 8 mW. The result was that recording marks were erased almost completely and unerased portions were negligible. The specific C/N ratios and erase ratios obtained are shown in Table II.

Furthermore, this recording medium was subjected to a one-beam overwrite test under the following conditions:

Linear Velocity of Disc Rotation: 1.3 m/sec
Recording Power (Pw): 11 mW
Erasing Power (Pe): 6 mW
Recording Frequency: $f_1$=0.40 MHz
$f_2$=0.72 MHz The result was that the C/N ratio and erase ratio were respectively 52 dB, and −34 dB, when overwriting was conducted in a track in which recording had been carried out with the recording frequency $f_1$. These results are also shown in Table II.

The above overwrite test was repeated more than 1000 times. No deterioration was observed in the characteristics of this recording medium after the overwrite test.

EXAMPLE II-2

The procedure for the fabrication of the optical information recording medium No. II-1 in Example II-1 was repeated except that the recording layer composed of $(AgSbTe_2)_{0.43}(InSb_{0.77})_{0.57}$ and the reflecting layer com-

TABLE I

| Example No. | Recording Power (mW) | 7 | 8 | 9 | 10 | 11 | 12 | 13 | 14 | Overwrite Mode (Pw/Pe = 12/7 mW) |
|---|---|---|---|---|---|---|---|---|---|---|
| Ex. I-1 | C/N (dB) | 38 | 46 | 49 | 51 | 52 | 53 | 54 | 54 | 52 |
|  | Erase Ratio (−dB) | 33 | 41 | 43 | 45 | 45 | 46 | 46 | 46 | 35 |
| Ex. I-2 | C/N (dB) | 41 | 45 | 48 | 51 | 54 | 54 | 54 | 54 | 53 |
|  | Erase Ratio (−dB) | 34 | 40 | 42 | 45 | 45 | 45 | 44 | 42 | 37 |
| Comp. Ex. I-1 | C/N (dB) | 15 | 22 | 31 | 35 | 36 | 37 | 38 | 40 |  |
|  | Erase Ratio (−dB) | 7 | 11 | 16 | 16 | 18 | 18 | 18 | 17 |  |
| Comp. Ex. I-2 | C/N (dB) | 11 | 20 | 36 | 42 | 47 | 49 | 49 | 48 |  |
|  | Erase Ratio (−dB) | 6 | 12 | 20 | 23 | 24 | 24 | 23 | 20 |  |
| Comp. Ex. I-3 | C/N (dB) | 12 | 15 | 25 | 33 | 39 | 40 | 41 | 42 |  |
|  | Erase Ratio (−dB) | 5 | 8 | 13 | 16 | 18 | 18 | 17 | 15 |  |

EXAMPLE II-1

A lower heat resistant protective layer composed of $ZnS+SiO_2$ (20%) was deposited to a thickness of 2000 Å on a polycarbonate substrate with a groove with a 1.6 μm pitch and a 700 Å groove depth, a 1.2 mm thickness, and a 120 mm diameter, using the rf sputtering method.

A recording layer composed of $(AgSbTe_2)_{0.43}(InSb_{0.77})_{0.57}$ was deposited to a thickness of 200 Å on the above prepared lower heat resistant protective layer, using the rf sputtering method.

posed of Au employed in Example II-1 were respectively replaced by a recording layer composed of $(AgSbTe_2)_{0.42}$ $(InSb_{2.1})_{0.58}$ and a reflecting layer composed of Ag, whereby an optical information recording medium No. II-2 according to the present invention was fabricated.

The thus fabricated optical information recording medium No. II-2 was subjected to the same evaluation test for evaluating the recording performance thereof and to the same one-beam overwrite test as in Example II-1. The results are shown in Table II. The overwrite test was repeated more than 1000 times in the same manner as in Example II-1. No deterioration was observed in the characteristics of this recording medium after the overwrite test.

COMPARATIVE EXAMPLE II-1

The procedure for the fabrication of the optical information recording medium No. II-1 in Example II-1 was repeated except that the recording layer composed of $(AgSbTe_2)_{0.43}(InSb_{0.77})_{0.57}$ employed in Example II-1 was replaced by a recording layer composed of $(AgSbTe_2)_{0.32}(InSb_{1.9})_{0.68}$, whereby a comparative optical information recording medium No. II-1 was fabricated.

The thus fabricated comparative optical information recording medium No. II-1 was subjected to the same evaluation test for evaluating the recording performance thereof. The results are shown in Table II.

COMPARATIVE EXAMPLE II-2

The procedure for the fabrication of the optical information recording medium No. II-1 in Example II-1 was repeated except that the recording layer composed of $(AgSbTe_2)_{0.43}(InSb_{0.77})_{0.57}$ and the upper heat resistant protective layer composed of SiC employed in Example II-1 were respectively replaced by a recording layer composed of $(AgSbTe_2)_{0.5}(InSb_{3.0})_{0.50}$ and an upper heat resistant protective layer composed of $ZnS+SiO_2$ (20%), whereby a comparative optical information recording medium No. II-2 was fabricated.

The thus fabricated comparative optical information recording medium No. II-2 was subjected to the same evaluation test for evaluating the recording performance thereof. The results are shown in Table II.

COMPARATIVE EXAMPLE II-3

The procedure for the fabrication of the optical information recording medium No. II-1 in Example II-1 was repeated except that the recording layer composed of $(AgSbTe_2)_{0.43}(InSb_{0.77})_{0.57}$ employed in Example II-1 was replaced by a recording layer composed of $(AgSbTe_2)_{0.36}(InSb_{0.84})_{0.64}$, whereby a comparative optical information recording medium No. II-3 was fabricated.

The thus fabricated comparative optical information recording medium No. II-3 was subjected to the same evaluation test for evaluating the recording performance thereof. The results are shown in Table II.

and a 700 Å groove depth, a 1.2 mm thickness, and a 120 mm diameter, using the rf sputtering method.

A recording layer of $(AgSbTe_2)_{0.43}(InSb_{0.77})_{0.57}$ was deposited to a thickness of 200 Å on the above prepared lower heat resistant protective layer, using the rf sputtering method.

An upper heat resistant protective layer composed of AlN was deposited to a thickness of 1500 Å on the above recording layer, using the rf sputtering method.

Finally a reflecting layer of Ag was deposited to a thickness of 900 Å on the upper heat resistant protective layer, using the rf sputtering method, whereby an optical information recording medium No. III-1 in the form of a disc according to the present invention was fabricated.

The evaluation of the above optical information recording medium No. III-1 was carried out in the same manner as in Example I-1. As a result, signals with C/N ratios of 45 dB or more were obtained with the write power in the range of 7 mW to 14 mW. The recorded signals were erased with the application of a DC light with a power of 7 mW. The result was that the recording marks were erased almost completely and unerased portions were negligible. The specific C/N ratios and erase ratios obtained are shown in Table III.

Furthermore, this recording medium was subjected to a one-beam overwrite test under the following conditions:

Linear Velocity of Disc Rotation: 1.3 m/sec

Recording Power (Pw): 12 mW

Erasing Power (Pe): 5 mW

Recording Frequency: $f_1$=0.40 MHz $f_2$=0.72 MHz

The result was that the C/N ratio and erase ratio were respectively 55 dB, and −40 dB, when overwriting was conducted in a track in which recording had been carried out with the recording frequency $f_1$. These results are also shown in Table III.

The above overwrite test was repeated more than 1000 times. No deterioration was observed in the characteristics of this recording medium after the overwrite test.

EXAMPLE III-2

The procedure for the fabrication of the optical information recording medium No. III-1 in Example III-1 was repeated except that the recording layer composed of $(AgSbTe_2)_{0.43}(InSb_{0.77})_{0.57}$ employed in Example III-1 was replaced by a recording layer composed of $(AgSbTe_2)_{0.47}(InSb_{1.2})_{0.53}$, whereby an optical information recording medium No. III-2 according to the present invention was fabricated.

The thus fabricated optical information recording medium No. III-2 was subjected to the same evaluation test for

TABLE II

| Example No. | Recording Power (mW) | 7 | 8 | 9 | 10 | 11 | 12 | 13 | 14 | Overwrite Mode (Pw/Pe = 12/6 mW) |
|---|---|---|---|---|---|---|---|---|---|---|
| Ex. II-1 | C/N (dB) | 37 | 43 | 47 | 49 | 51 | 52 | 52 | 53 | 52 |
|  | Erase Ratio (−dB) | 34 | 40 | 42 | 43 | 47 | 47 | 47 | 44 | 34 |
| Ex. II-2 | C/N (dB) | 40 | 44 | 48 | 49 | 51 | 51 | 51 | 51 | 51 |
|  | Erase Ratio (−dB) | 35 | 39 | 42 | 43 | 43 | 43 | 43 | 43 | 35 |
| Comp. Ex. II-1 | C/N (dB) | 10 | 17 | 23 | 34 | 37 | 37 | 38 | 40 |  |
|  | Erase Ratio (−dB) | 6 | 10 | 15 | 19 | 19 | 20 | 18 | 16 |  |
| Comp. Ex. II-2 | C/N (dB) | 13 | 23 | 36 | 44 | 48 | 48 | 48 | 48 |  |
|  | Erase Ratio (−dB) | 9 | 13 | 16 | 20 | 23 | 23 | 22 | 22 |  |
| Comp. Ex. II-3 | C/N (dB) | 15 | 19 | 19 | 28 | 37 | 39 | 41 | 42 |  |
|  | Erase Ratio (−dB) | 10 | 13 | 12 | 15 | 17 | 20 | 20 | 20 |  |

EXAMPLE III-1

A lower heat resistant protective layer composed of $ZnS+SiO_2$ (20%) was deposited to a thickness of 2000 Å on a polycarbonate substrate with a groove with a 1.6 μm pitch evaluating the recording performance thereof, and to the same one-beam overwrite test as in Example III-1. The results are shown in Table III. The overwrite test was repeated more than 1000 times in the same manner as in Example III-1. No deterioration was observed in the characteristics of this recording medium after the overwrite test.

COMPARATIVE EXAMPLE III-1

The procedure for the fabrication of the optical information recording medium No. III-1 in Example III-1 was repeated except that the recording layer composed of $(AgSbTe_2)_{0.43}(InSb_{0.77})_{0.57}$ employed in Example III-1 was replaced by a recording layer composed of $(AgSbTe_2)_{0.32}(InSb_{1.9})_{0.68}$, whereby a comparative optical information recording medium No. III-1 was fabricated.

The thus fabricated comparative optical information recording medium No. III-1 was subjected to the same evaluation test for evaluating the recording performance thereof. The results are shown in Table III.

COMPARATIVE EXAMPLE III-2

The procedure for the fabrication of the optical information recording medium No. III-1 in Example III-1 was repeated except that the recording layer composed of $(AgSbTe_2)_{0.43}(InSb_{0.77})_{0.57}$ and the upper heat resistant protective layer composed of AlN employed in Example III-1 were respectively replaced by a recording layer composed of $(AgSbTe_2)_{0.50}(InSb_{3.0})_{0.50}$ and an upper heat resistant protective layer composed of $ZnS+SiO_2$ (20%), whereby a comparative optical information recording medium No. III-2 was fabricated.

The thus fabricated comparative optical information recording medium No. III-2 was subjected to the same evaluation test for evaluating the recording performance thereof. The results are shown in Table III.

COMPARATIVE EXAMPLE III-2

The procedure for the fabrication of the optical information recording medium No. III-1 in Example III-1 was repeated except that the recording layer composed of $(AgSbTe_2)_{0.43}(InSb_{0.77})_{0.57}$ employed in Example III-1 was replaced by a recording layer composed of $(AgSbTe_2)_{0.62}(InSb_{1.8})_{0.38}$, whereby a comparative optical information recording medium No. III-3 was fabricated.

The thus fabricated comparative optical information recording medium No. III-3 was subjected to the same evaluation test for evaluating the recording performance thereof. The results are shown in Table III.

EXAMPLE IV

A lower heat resistant protective layer composed of $ZnS+SiO_2$ (20%) was deposited to a thickness of 2000 Å on a pregrooved polycarbonate disc substrate with a 3.5 inch diameter, using the rf magnetron sputtering method.

A recording layer composed of $(AgSbTe_2)_{0.48}(InSb_{1.86})_{0.52}$ was deposited to a thickness of 200 Å on the above prepared lower heat resistant protective layer, using the rf magnetron sputtering method.

An upper heat resistant protective layer composed of AlN was deposited to a thickness of 1500 Å on the above recording layer, using the rf magnetron sputtering method.

Finally a reflecting layer of Ag was deposited to a thickness of 700 Å on the upper heat resistant protective layer, using the rf magnetron sputtering method, whereby an optical information recording medium No. IV-1 in the form of a disc according to the present invention was fabricated.

The recording layer was in an amorphous state when the optical information recording medium No. IV-1 was fabricated.

The recording layer was sufficiently crystallized for initialization by application of a semiconductor laser beam with a wavelength of 830 nm thereto, whereby the state of the recording layer was changed to an unrecorded state.

The thus obtained optical recording medium No. IV-1 was evaluated with respect to the dependance of the C/N ratio and the erase ratio (Ers.) upon the peak power (Pp) and the bias power (Pb) at a linear velocity of disc rotation of 2.6 m/sec.

Figure 3:
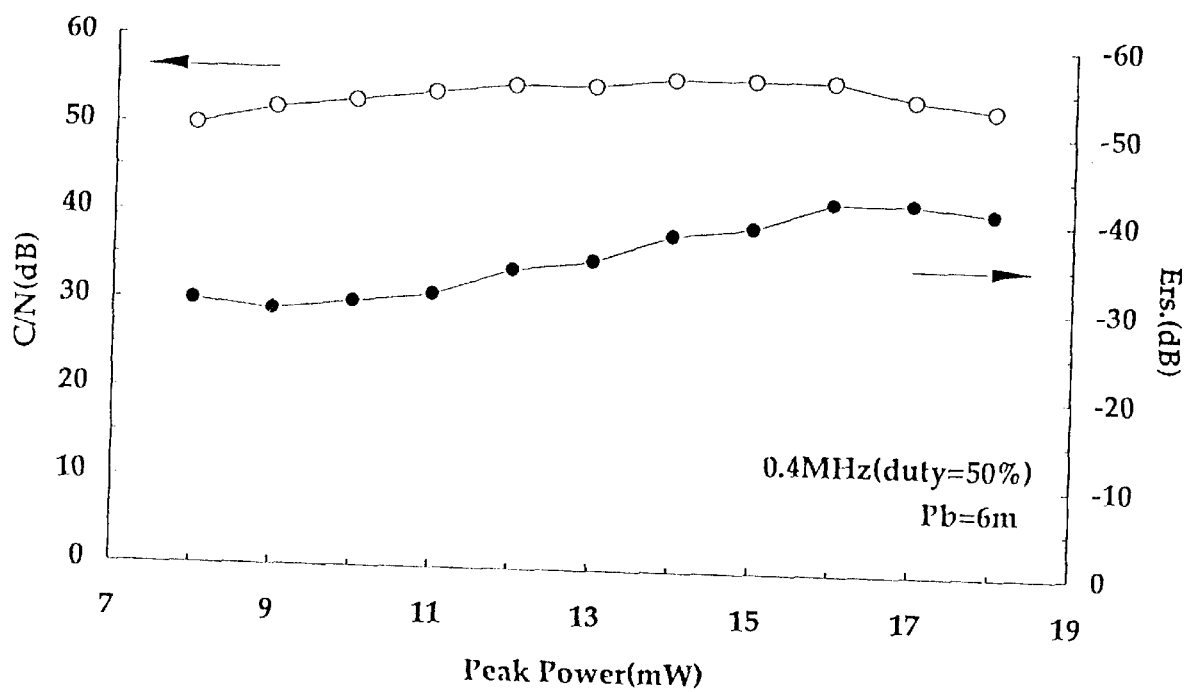
FIG. 3 is a graph showing the dependance of the C/N ratio and the erase ratio (Ers.) of an optical information recording medium No. IV-1 according to the present invention upon the peak power (mW) under a constant bias power (Pb) of 6 mW when one-beam overwrite was conducted with a frequency of 0.4 MHz (duty 50%) after signal recording was conducted with a frequency of 14 MHz (duty 50%)

FIG. 3 is a graph showing the dependance of the C/N ratio and the erase ratio (Ers.) upon the peak power (mW) under a constant bias power (Pb) of 6 mW when one-beam overwrite was conducted with a frequency of 0.4 MHz (duty 50%) after signal recording was conducted with a frequency of 1.4 MHz (duty 50%).

Figure 4:
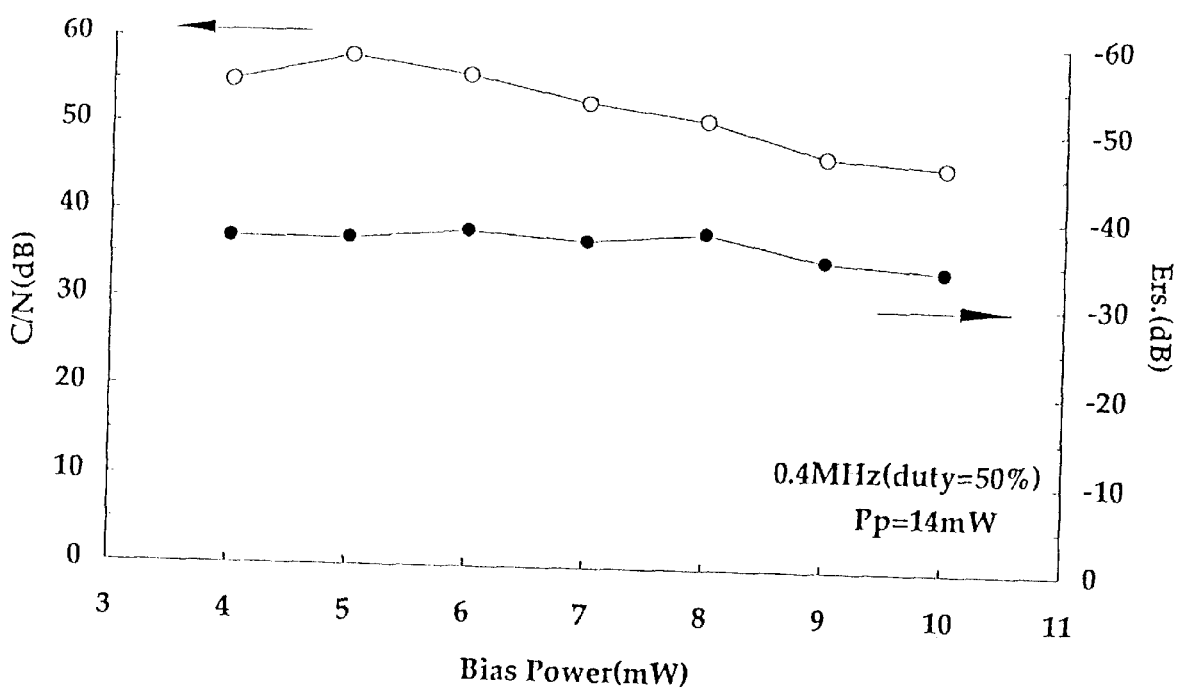
FIG. 4 is a graph showing the dependance of the C/N ratio and the erase ratio (Ers.) of the recording medium No IV-1 upon the bias power (mW) under a constant peak power (Pp) of 14 mW when one-beam overwrite was conducted with a frequency of 0.4 MHz (duty 50%) after signal recording was conducted with a frequency of 1.4 MHz (duty 50%)

FIG. 4 is a graph showing the dependance of the C/N ratio and the erase ratio (Ers.) upon the bias power (mW) under a constant peak power (Pp) of 14 mW when one-beam overwrite was conducted with a frequency of 0.4 MHz (duty 50%) after signal recording was conducted with a frequency of 1.4 MHz (duty 50%).

Figure 5:
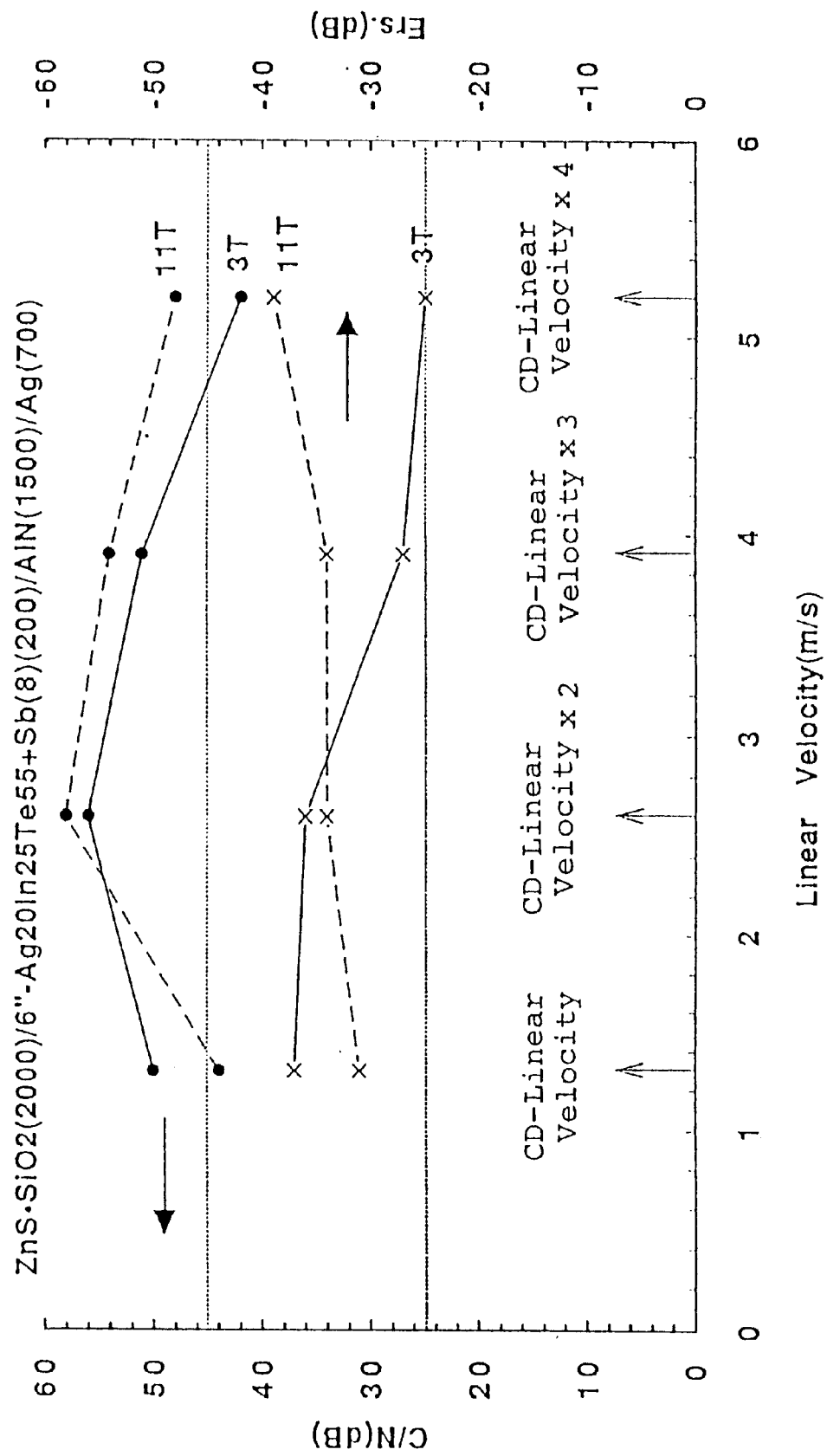
FIG. 5 is a graph showing the dependance of the C/N ratio and erase ratio of the recording medium No. IV-1 upon the liner velocity of disc rotation.

FIG. 5 is a graph showing the dependance of the C/N ratio and erase ratio of the recording medium No. IV-1 upon the liner velocity of disc rotation. The results shown in this graph indicate that the dependence upon the linear velocity of disc rotation is excellent in the range of the linear velocity of 1.2 m/sec to 5.6 m/sec (corresponding to CD linear velocity to 4 times CD linear velocity). In FIG. 5, 3T and 11T respectively indicate EMF signals.

TABLE III

| Example No. | Recording Power (mW) | 7 | 8 | 9 | 10 | 11 | 12 | 13 | 14 | Overwrite Mode (Pw/Pe = 12/5 mW) |
|---|---|---|---|---|---|---|---|---|---|---|
| Ex. III-1 | C/N (dB) | 45 | 48 | 50 | 53 | 54 | 55 | 55 | 56 | 55 |
|  | Erase Ratio (–dB) | 41 | 44 | 47 | 48 | 50 | 50 | 48 | 45 | 40 |
| Ex. III-2 | C/N (dB) | 45 | 47 | 51 | 53 | 54 | 55 | 55 | 55 | 55 |
|  | Erase Ratio (–dB) | 40 | 44 | 48 | 49 | 49 | 48 | 47 | 45 | 38 |
| Comp. Ex. III-1 | C/N (dB) | 20 | 37 | 43 | 45 | 45 | 46 | 46 | 47 |  |
|  | Erase Ratio (–dB) | 18 | 22 | 23 | 24 | 23 | 21 | 20 | 20 |  |
| Comp. Ex. III-2 | C/N (dB) | 22 | 40 | 43 | 44 | 45 | 46 | 46 | 46 |  |
|  | Erase Ratio (–dB) | 13 | 19 | 21 | 24 | 23 | 21 | 18 | 15 |  |
| Comp. Ex. III-3 | C/N (dB) | 25 | 40 | 43 | 44 | 45 | 45 | 46 | 47 |  |
|  | Erase Ratio (–dB) | 20 | 28 | 26 | 23 | 23 | 20 | 21 | 18 |  |

Furthermore, EFM random signals were overwritten by one-beam overwriting by use of a CD encoder, with Pp/Pb being 14/6 mW, and reproduced signals were evaluated. As a result, an extremely excellent eye pattern was obtained, whereby it was confirmed that this recording medium can be used as a disc for musical signals. The jitter during this one-beam overwrite test was 12 nsec. This was extremely excellent.

Thus, the present invention provides a phase-change type information recording medium having excellent recording and erasing performance even when recording and erasing are conducted at a considerably low linear velocity of disc rotation. More specifically, a rewritable compact disc with CD linear velocity to four times CD linear velocity. This is achieved by the combined use of a recording material having excellent crystalline - amorphous phase transition characteristics, an upper heat resistant protective layer with high thermal conductivity, and a reflecting layer.

What is claimed is:

1. An optical information recording medium capable of recording information, reproducing recorded information, erasing recorded information, and rewriting recorded information, comprising:

a substrate, a recording layer formed on said substrate, said recording layer comprising as the main component a four-component phase-change recording material comprising Ag, In, Te and Sb, and containing a microcrystalline phase comprising the crystallites of $AgSbTe_2$ at the erasure of recorded information, said phase-change recording material at the erasure of recorded information consisting of a composition represented by $(AgSbTe_2)_x(InSb_y)_{1-x}$, in which $InSb_y$ is in an amorphous state and the crystallites of $AgSbTe_2$ are surrounded by $InSb_y$, wherein $0.4 \leq x \leq 0.55$ and $0.5 \leq y \leq 2.5$, an upper heat resistant protective layer formed on said recording layer, said upper heat resistant protective layer comprising a heat resistant material, and an optical reflecting layer formed on said upper heat resistant protective layer.

2. The optical information recording medium as claimed in claim 1, wherein said crystallites of $AgSbTe_2$ in said microcrystalline phase is in the range of 1000 Å or less.

3. The optical information recording medium as claimed in claim 1, wherein said heat resistant material for said upper heat resistant protective layer is selected from the group consisting of cubic-BN, SiC, and AlN.

4. The optical information recording medium as claimed in claim 1, further comprising a lower heat resistant protective layer which is interposed between said substrate and said recording layer.

5. The optical information recording medium as claimed in claim 1, wherein said optical reflecting layer comprises a component selected from the group consisting of Ag, Au or alloys thereof.

6. An optical information recording method, using an optical information medium capable of recording information, reproducing recorded information, erasing recorded information, and rewriting recorded information, comprising a substrate, a recording layer formed on said substrate, said recording layer comprising as the main component a four-component phase-change recording material comprising Ag, In, Te and Sb, and containing a microcrystalline phase comprising the crystallites of $AgSbTe_2$ at the erasure of recorded information, said phase-change recording material at the erasure of recorded information consisting of a composition represented by $(AgSbTe_2)_x(InSb_y)_{1-x}$, in which $InSb_y$ is in an amorphous state and the crystallites of $AgSbTe_2$ are surrounded by $InSb_y$, wherein $0.4 \leq x \leq 0.55$ and $0.5 \leq y \leq 2.5$, an upper heat resistant protective layer formed on said recording layer, said upper heat resistant protective layer comprising a heat resistant material, and an optical reflecting layer formed on said upper heat resistant protective layer, comprising:

the step of applying a laser beam to said recording layer through said substrate as the optical information recording medium is rotated at a linear velocity of 1.2 to 5.6 m/sec.

* * * * *